United States Patent
Oh et al.

(10) Patent No.: US 6,519,458 B2
(45) Date of Patent: Feb. 11, 2003

(54) WIRELESS DATA TRANSPORT METHOD, AND MOBILE TERMINAL AND INTERWORKING FUNCTION DEVICE THEREFOR

(75) Inventors: Kang-hwan Oh, Suwon (KR); Sang-seo Lee, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/357,150

(22) Filed: Jul. 19, 1999

(65) Prior Publication Data

US 2002/0068609 A1 Jun. 6, 2002

(30) Foreign Application Priority Data

Oct. 29, 1998 (KR) .............................. 98-45731

(51) Int. Cl.[7] .............................. H04Q 7/20; H04B 7/20; H04L 12/66; H04J 3/16; H04J 3/22
(52) U.S. Cl. ........................ 455/445; 455/550; 455/560; 370/352; 370/466; 370/467; 370/401
(58) Field of Search ................................. 455/466, 433, 455/445, 436, 439, 560, 550; 370/475, 335, 342, 469, 328, 331, 352, 466, 398, 337, 467, 401; 375/222

(56) References Cited

U.S. PATENT DOCUMENTS

| | | | | |
|---|---|---|---|---|
| 4,837,800 | A | * 6/1989 | Freeburg et al. | 455/557 |
| 5,729,536 | A | * 3/1998 | Doshi et al. | 370/398 |
| 5,802,465 | A | * 9/1998 | Hamalainen et al. | 455/404 |
| 5,917,816 | A | * 6/1999 | Jacobsohn | 370/352 |
| 5,949,773 | A | * 9/1999 | Bhalla et al. | 370/331 |
| 5,953,322 | A | * 9/1999 | Kimball | 370/328 |
| 6,111,866 | A | * 8/2000 | Kweon et al. | 370/335 |
| 6,201,965 | B1 | * 3/2001 | Mizell et al. | 455/433 |
| 6,359,896 | B1 | * 3/2002 | Baker et al. | 370/252 |
| 6,377,799 | B1 | * 4/2002 | Hameleers et al. | 370/466 |
| 6,385,195 | B2 | * 5/2002 | Sicher et al. | 370/328 |

FOREIGN PATENT DOCUMENTS

| | | | |
|---|---|---|---|
| EP | 0 789 499 A2 | 8/1997 | H04Q/7/22 |
| JP | 6-164645 | 6/1994 | H04L/12/66 |
| JP | 10-215330 | 8/1998 | H04M/11/00 |
| WO | 95/08900 A1 | * 3/1995 | 455/403 |

OTHER PUBLICATIONS

Communication from a Foreign Patent Office.

* cited by examiner

*Primary Examiner*—Nay Maung
*Assistant Examiner*—Raymond Persino
(74) *Attorney, Agent, or Firm*—Sughrue Mion, PLLC

(57) ABSTRACT

A wireless data transport method, and a mobile terminal and an interworking function (IWF) device therefor. In the wireless data transport method performed using a mobile terminal, an IWF device and a server, a dialing is performed in the mobile terminal using a predetermined command with an identifier including an IP (Internet Protocol) address, and then RLP (Radio Link Protocol) between the mobile terminal and the IWF device is synchronized to establish a circuit-switched data (CSD) channel according to the command. Then, PPP (Point-to-Point Protocol)/TCP (Transmission Control Protocol) is performed in the IWF device according to the identifier, and a network interface channel is then opened by an AT (ATtention) processing unit of the IWF device according to the IP address of the identifier. Therefore, the mobile terminal can be connected directly to a network interface which is an Internet connect port, using a CSD channel which is preferred by network service providers, not using a modem.

18 Claims, 3 Drawing Sheets

WIRELESS DATA TRANSPORT METHOD, AND MOBILE TERMINAL AND INTERWORKING FUNCTION DEVICE THEREFOR

BACKGROUND OF THE INVENTION

1. Field of the Invention

The present invention relates to a wireless data transport method, and a mobile terminal and an interworking function device therefor, and more particularly, to a wireless data transport method in which a direct connection through a circuit-switched data (CSD) channel to a server is possible, and a mobile terminal and an interworking function device therefor.

2. Description of the Related Art

Data transferred through a data communication channel are divided into circuit-switched data (CSD) and packet-switched data (PSD). A channel for the CSD is exclusively occupied by a user connected, but a channel for the PSD is shared by many users in packet units. However, existing networks being in use adopt a CSD channel mode in general and network service providers prefer the CSD channel due to the problem of charge collecting.

FIG. 1 shows conventional main protocol layers of a transport system 1 adopting a circuit-switched data (CSD) channel. Referring to FIG. 1, in a connection method of the conventional transport system, assuming that an identifier to be connected, e.g., a telephone number, is XXXX, a mobile terminal 2 requests a connection to a specific host of an interworking function (IWF) device 3 using an ATention Dial (ATD) command including the identifier, i.e., ATD XXXX. Then, a modem 6 of the IWF device 3 calls a pre-specified host 5 through a public switched telephone network (PSTN) using the telephone number. As a result, a call configuration between the host 5 and the IWF device 3 is achieved. Accordingly, a transport session is established between the mobile terminal 2 which asks for a service and a host, such that the information service to the mobile terminal starts.

However, such conventional connection method through the CSD channel utilizes a land line modem 6 that is installed in the IWF device 3, which is connected to a PSTN through the modem 6, and the connection to the HOST or external packet network is achieved through this PSTN. The method has a disadvantage in that a delay factor exists since it performs a modem connection in a state in which a CDMA CSD air connection is already set. Further, the method has a disadvantage in that the air connection may be disconnected due to timing out in the PSTN, so that a call may be interrupted unintentionally.

As described above, in a case where a wireless terminal adopting WAP (Wireless Application Protocol) utilizes the application with a network interface such as a web service, as illustrated by the direct connections of WAP 8 and 9 in the mobile terminal 2 to the respective corresponding WAP 10 and 11 in the host 5, a method for a direct connection to the network interface using a CSD channel, and not a modem, is required.

SUMMARY OF THE INVENTION

To solve the above problems, it is an object of the present invention to provide a wireless data transport method in which, when a mobile terminal intends to use the application with a network interface such as a web service, the wireless terminal can be connected directly to the network interface which is the Internet connect port, using a circuit-switched data (CSD) channel, and not using a modem.

It is another object of the present invention to provide a mobile terminal capable of being directly connected to the network interface through the CSD channel when performing the application for connection with the Internet, which is embodied by the above method.

It is still another object of the present invention to provide an interworking function (IWF) device for connecting directly the mobile terminal to the network interface through the CSD channel.

Accordingly, to achieve the above first object, there is provided a wireless data transport method comprising the steps of performing a dialing in the mobile terminal using a predetermined command with an identifier including an IP (Internet Protocol) address. RLP (Radio Link Protocol) between the mobile terminal and the IWF device is synchronized to establish a circuit-switched data (CSD) channel according to the command, and then PPP (Point-to-Point Protocol)/TCP (Transmission Control Protocol) is performed in the IWF device according to the identifier. Then, a network interface channel is opened by an AT (ATtention) processing unit of the IWF device according to the IP address of the identifier.

According to an aspect of the second object, there is provided a mobile terminal comprising: an AT (ATtention dial command) processing unit for performing a dialing using a predetermined command with an identifier including an IP (Internet Protocol) address; a data formatting unit for formatting the data output from the AT processing unit into a circuit-switched data (CSD) format; and an RLP (Radio Link Protocol) performing unit for performing RLP synchronization for a radio link between the mobile terminal and the IWF unit to establish a CSD channel.

According to another aspect of the second object, there is provided a mobile terminal comprising: an AT (ATtention dial command) processing unit for performing a dialing using the ATtention Dial (ATD) command with an identifier including an IP (Internet Protocol) address; a data formatting unit for formatting the data input from the AT processing unit into a circuit-switched data (CSD) or a packet-switched data (PSD) according to the selection of a user; and a radio link protocol performing unit for performing an RLP synchronization for a radio link between the mobile terminal and the IWF unit to establish the channel selected according to the command.

According to an aspect of the third object, there is provided an interworking function (IWF) device comprising: an RLP (Radio Link Protocol) performing unit for performing synchronization with the mobile terminal for a radio link, to establish a wireless data channel; a data formatting unit for extracting dialing information from data of the circuit-switched data (CSD) format input through the RLP performing unit; an ATtention Dial (ATD) processing unit for extracting an identifier including an IP (Internet Protocol) address from the dialing information; and a network interface unit to connect to a network server corresponding to the identifier.

According to another aspect of the third object, there is provided an interworking function (IWF) device comprising: an RLP (Radio Link Protocol) performing unit for performing synchronization with the mobile terminal for a radio link, to establish a wireless data channel; a data formatting unit for selectively extracting an identifier by identifying whether the data input through the wireless data channel connected by the RLP performing unit has a circuit-switched data (CSD) format or a packet-switched data (PSD) format; an ATention Dial (ATD) processing unit for performing dialing using a predetermined command with the identifier if the extracted identifier is a telephone number; a modem unit to connect to a server corresponding to the telephone number via a public switched telephone network (PSTN) if the extracted identifier is a telephone number; and a network interface unit to connect to a server corresponding to IP (Internet Protocol) address if the extracted identifier is an IP address.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
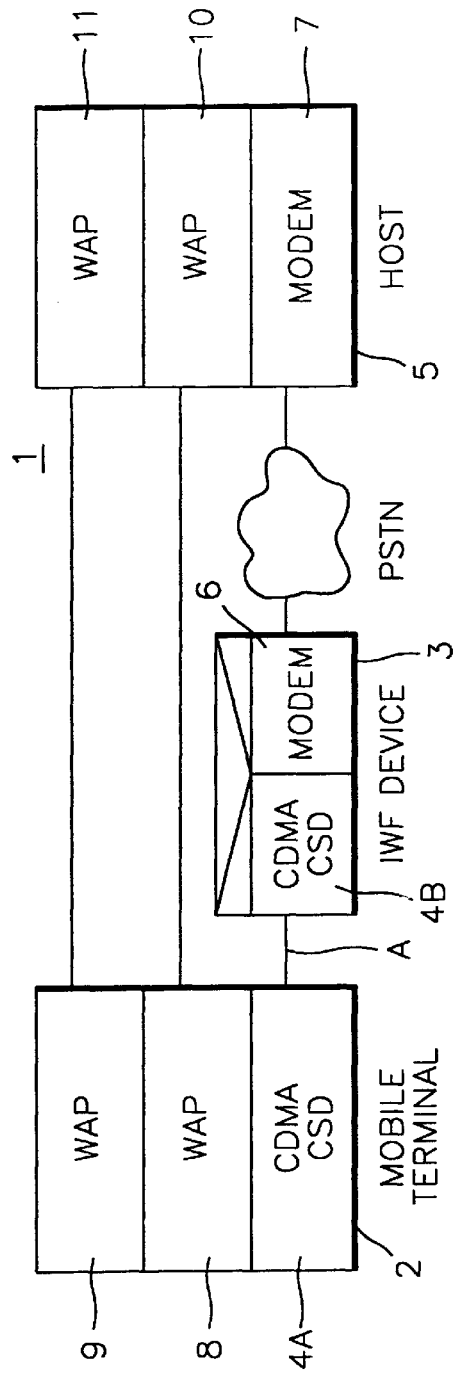
FIG. 1 shows a conventional arrangement of the main protocol layers of a transport system utilizing a circuit-switched data (CSD) channel.
Figure 2:
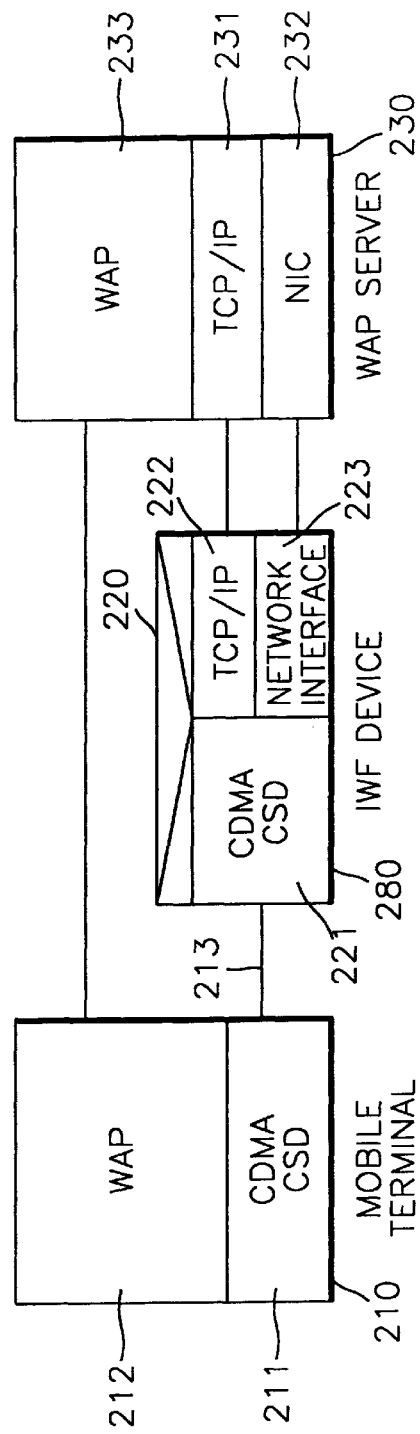
FIG. 2 shows the main protocol layers of a wireless data transport system which implements a wireless data transport method according to the present invention.

Referring to FIG. 2, which shows the main protocol layers of a wireless data transport system 200 that embodies the present invention and implementing a wireless data transport method according to the present invention. As seen in the Figure, the main protocol layers comprise three basic components. First, there is a protocol layer 210 for a mobile terminal, a protocol layer 220 for an interworking function (IWF) device and a protocol layer 230 for a WAP (Wireless Application Protocol) server.

The protocol layer 210 for the mobile terminal includes code division multiple access circuit-switched data (CDMA CSD) wireless connection protocol 211 and WAP (Wireless Application Protocol) 212. The CDMA CSD wireless connection protocol 211 comprises the RLP (Radio Link Protocol), the AT (ATtention dial command) processing protocol and a data formatting protocol, which are not illustrated but are simplified protocols with the RLP and the data formatting protocol using a CSD channel 213.

The protocol layer 280 for the IWF device 220 includes a CDMA CSD wireless connection protocol 221, like the protocol layer 210 for the mobile terminal. The CDMA CSD wireless connection protocol in the mobile terminal 210 comprises the RLP and the AT processing protocol and a data formatting protocol, which are also simplified protocols with the RLP and the data formatting protocol using a CSD channel 213, like the mobile terminal 210.

Also, as shown in FIG. 2, the protocol layer 280 for the IWF device 220 includes TCP/IP (Transmission Control Protocol/Internet Protocol) 222 and network interface protocol 223, which are for connection with an external server, not through a modem. However, the IWF device 220 may comprise a modem interface (not shown) selectively through which the connection with the external server can be achieved.

In the mobile terminal the RLP is a protocol for performing a radio link through a channel and the AT processing protocol is for dialing. In this case, it is preferable to use a protocol standardized in the TIA/EIA IS-592 as the AT processing protocol. The data formatting protocol formats circuit switched data (CSD) transported through a CSD channel exclusively occupied by one user and packet switched data (PSD) transported in packet units through a PSD channel shared by many users at the same time. Here, the transport through the CSD channel may be performed according to the IS-99 and the transport through the PSD channel may be performed according to the IS-657. The WAP is a protocol, which is being diversified and standardized in various modes, that enables the mobile terminal itself to carry out an Internet service, facsimile service, electronic mail service and TCP/IP connection, through wireless connection.

In the IWF device 220, the RLP is for a radio link through a channel with the mobile terminal and the AT processing protocol is for connection through a modem or a network interface 223 to the WAP server using an ATtention Dial (ATD) command received from the mobile terminal. The data formatting protocol formats CSD transported through a CSD channel and PSD transported through a PSD channel. Thus, the WAP of the mobile terminal and the TCP/IP protocol 222 and network interface protocol 223 of the IWF device 220 are connected to the corresponding protocols 231 and 232 of the protocol layer 230 for the WAP server.

Figure 3:
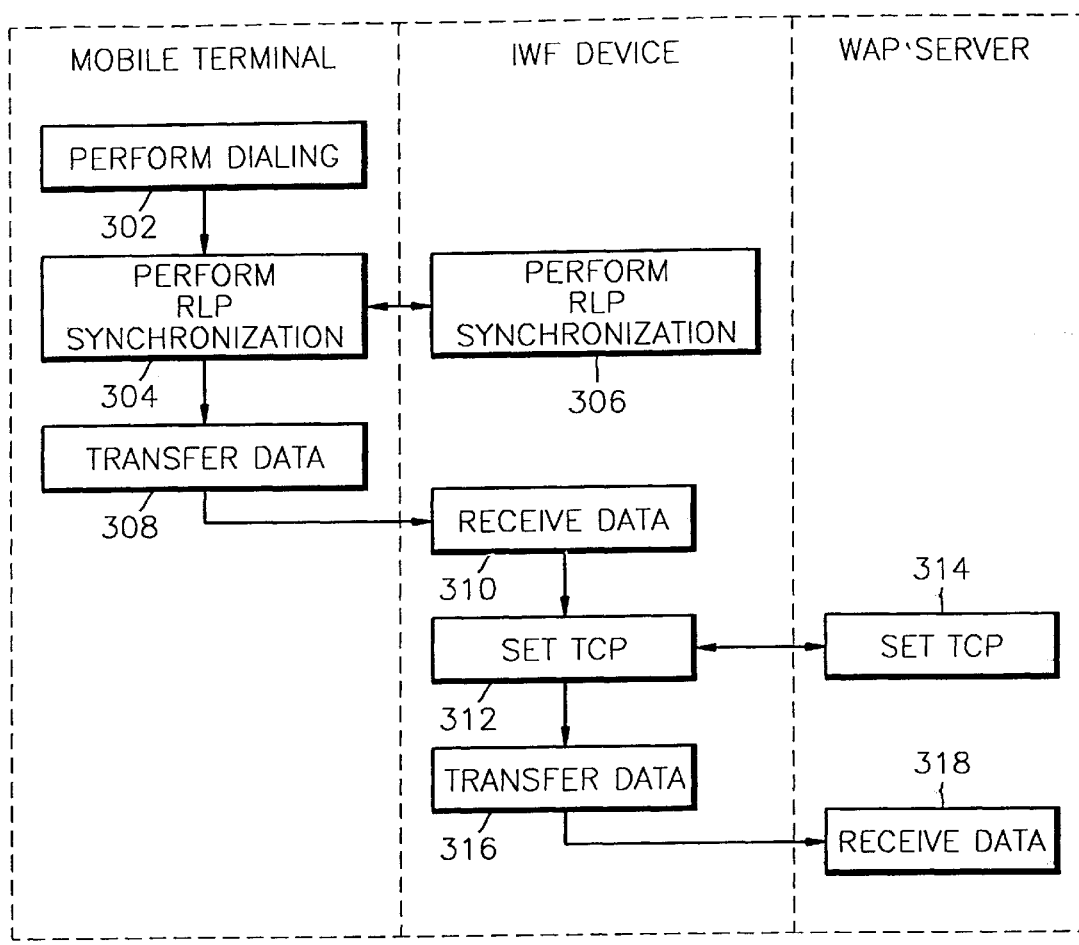
FIG. 3 is a flowchart illustrating the major steps of the wireless data transport method according to a preferred embodiment of the present invention.

FIG. 3 is a flowchart illustrating the major steps of a wireless data transport method according to a preferred embodiment of the present invention.

Referring to FIGS. 2 and 3, first, dialing is performed (step 302) at the mobile terminal. In the step 302, dialing is performed by inputting an identifier of a destination to be connected. In general, the identifier is a telephone number of a switched network provider that serves the connection to a destination server. However, if the application selected by the user is an Internet application in this embodiment, an identifier including an IP (Internet Protocol) address can be input directly and dialing can be performed. Preferably, the IP address is expressed by a dot notation, e.g., "xxx.xxx.xxx.xxx". Also, for the dialing command, the ATD command prescribed in the standard protocols according to the TIA/EIA IS-592 is preferably used, which is common in data communications.

Then, an RLP synchronization is performed for a radio link between the mobile terminal and the IWF device according to the identifier to form a CSD channel (steps 304 and 306). Preferably, the RLP synchronization is performed based on a code division multiple access (CDMA) system that is suitable for transmission of digital data.

Incidentally, in the case where a user intends to use a PSD channel and not the CSD channel, the step of inputting information about the application to be used in the mobile terminal and about the channel which the user wants to use, e.g., CSD channel or PSD channel, may be performed before the step 302. For example, if the Internet-related application is to be used in the mobile terminal and the selected channel is the CSD channel, the ATD command with the identifier including the IP address is input for the dialing in the step 302. Then, the RLP synchronization is performed for a radio link between the mobile terminal and the IWF device according to the ATD command, so that a CSD channel is formed.

If the ratio link is successful, the mobile terminal transfers the data with the identifier through the connected CSD channel to the IWF device (step 308), and the IWF device receives the data (step 310). Accordingly, the IWF device can get information for determining whether to connect to a PSTN using a MODEM, and then to connect to the server through the PSTN, or to directly connect to the server through a network interface, for the connection to a destination (server) corresponding to the identifier included in the received data.

Also, the mobile terminal may be structured to selectively use the CSD channel or the PSD channel. In the case where the connection is achieved through the CSD channel, it is preferable that an AT processing unit of the IWF device determines the type of the identifier, i.e., whether the identifier is a telephone number or an IP address expressed by a dot notation. If the identifier is a telephone number, the AT processing unit of the IWF device opens a modem data channel, and if the identifier is an IP address, the AT processing unit opens a network interface channel. On the other hand, if the connection is achieved through the PSD channel, the AT processing unit of the IWF device opens the network interface channel as in the conventional method.

Next, in the case where the connection is achieved through the CSD channel, it would not be directly connected to the Internet. Therefore PPP/TCP is performed between the IWF device and the server for data transmission (steps 312 and 314). This is unlike the case of using the PSD channel. Accordingly, in the case where a connection is achieved through the CSD channel according to an IP address, PPP/TCP is performed between the IWF device and the server (steps 312 and 314) according to the IP address of the identifier. Then, a routing to the address corresponding to the identifier is performed such that the mobile terminal transfers the data (step 316) and the server receives the transferred data (step 318) according to the Internet application. In this manner, data transmission according to the Internet application is performed between the mobile terminal and the server.

Figure 4:
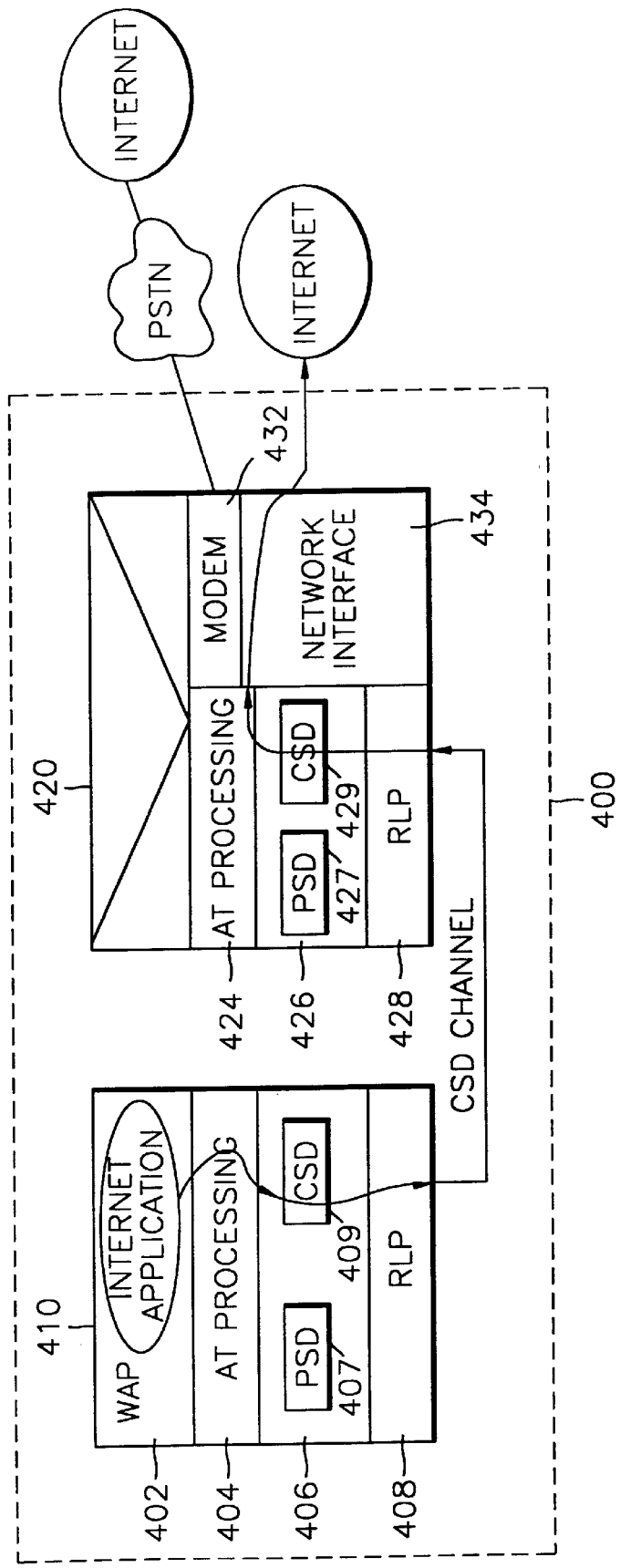
FIG. 4 shows the main protocol layers for a wireless data transport system according to a preferred embodiment of the present invention.

FIG. 4 shows the main protocol layers for a wireless data transport system according to a preferred embodiment of the present invention.

Referring to FIG. 4, the wireless data transport system 400 comprises a mobile terminal 410 and an IWF device 420. The mobile terminal 410 includes an AT processing unit 404, a data formatting unit 406 and an RLP performing unit 408. Also, the mobile terminal 410 may comprise a WAP performing unit 402. Preferably, the data formatting unit 406 comprises a CSD formatting subunit 409 and a PSD formatting subunit 407. The IWF device 420, which has a similar structure to the mobile terminal 410, comprises an AT processing unit 424, a data formatting unit 426 and a RLP performing unit 428. Preferably, the data formatting unit 426 comprises a CSD formatting subunit 429 and a PSD formatting subunit 427. Also, the IWF device 420 includes a modem 432, e.g., a land line modem, through which the IWF device 420 is connected to an external server via a PSTN, and a network interface unit 434 which is directly connected to the external server.

Hereinafter, the operation of the wireless data transport system having the above structure will be described.

First, the WAP performing unit 402 of the mobile terminal 410 performs the wireless application such that the mobile terminal 410 itself can provide an Internet service, facsimile service, electronic mail service and TCP/IP connection through a wireless connection according to the selection of a user. However, such application may be performed by an additional external device (not shown) which is well known to those skilled in the art.

The AT processing unit 404 performs a protocol for a dialing, e.g., by using the ATD command according to the standard protocols of the TIA/EIA IS-592, described with reference to FIG. 2. If a user selects the Internet application, the dialing can be performed by directly inputting an identifier including the IP address. Preferably, the IP address is expressed by dot donation, e.g., "xxx. xxx. xxx.xxx".

The data formatting unit 406 formats data output from the WAP performing unit 402 into CSD to be transported through a CSD channel which is exclusively occupied by a user, or PSD to be transported in packet units through a PSD channel which is shared by a plurality of users at the same time. Preferably, the data format to be transported is determined according to the data communication channel that the user selects to use. However, in the case where a user does not select a data communication channel, the data communication channel is selected according to the characteristics of the application in use, e.g., CSD channel for the facsimile application and PSD channel for the Internet application. Hereinafter, the following operation will be described on the assumption that a user selects a CSD channel.

The RLP performing unit 408 performs the protocol for a radio link according to the selected data channel, i.e., CSD channel, to connect to the IWF device 420.

The RLP performing unit 428 of the IWF device 420 performs the protocol for a radio link with the mobile terminal 410 according to the signal input through the channel.

The data formatting unit 426 identifies whether the data input from the RLP performing unit 428 is the CSD or PSD, such that the IWF device 420 is connected to the mobile terminal 410 through the channel selected by a user, e.g., the CSD channel. To maintain the connection with the mobile terminal 410, the AT processing unit 424, the data formatting unit 426 and the RLP performing unit 428 of the IWF device 420 may operate in the same manner as the AT processing unit 404, the data formatting unit 406 and the RLP performing unit 408 of the mobile terminal 410. As a result, the mobile terminal 410 and the IWF device 420 are wirelessly connected through the CSD channel.

The AT processing unit 424 extracts the identifier including the identifying information on the server or the PSTN to be connected from the ATD command input through the CSD channel. The identifier may be a telephone number or an IP address according to the type of application and the selection of the user. However, in this embodiment, it is assumed that the identifier is the IP address for the purpose of the present invention. If the IP address is extracted as the identifier, the IWF device 420 is connected through the network interface unit 434 corresponding to the identifier to the server such as an Internet server. In the case where the extracted identifier is a telephone number, the IWF device 420 is connected to the PSTN via the modem 432 and then to the server which provides the desired application.

As described above, the connection through the CSD channel is achieved by performing dialing in the mobile terminal according to an identifier including a network connection address such as an IP address using a predetermined dialing method, e.g., using the ATD command, by formatting data into a CSD format, and by directly connecting the IWF device to the server according to the identifier. As a result, the mobile terminal can be connected directly to the network interface such as an Internet connection port even when the CSD channel is used instead of a modem.

The above embodiment has been described based on the mobile terminal adopting WAP. However, all mobile terminals capable of transmitting data can be connected to a server through a data channel according to the application selected in an external information processing device such as a personal computer, which is obvious to those skilled in the art, so the present invention is not limited to the mobile terminal using the WAP.

Indeed, while the present invention has been described in accordance with the structure of preferred embodiments, it is not limited thereto and a variety of modifications within the scope of the disclosed and claimed invention may be realized by one of ordinary skill in the art, the invention being limited only by the appended claims.

What is claimed is:

1. A wireless data transport method performed using a mobile terminal, an interworking function (IWF) device and a server, the method comprising the steps of:
   (a) performing a dialing in the mobile terminal using a predetermined command with an identifier including an IP (Internet Protocol) address;
   (b) synchronizing a RLP (Radio Link Protocol) between the mobile terminal and the IWF device to establish a circuit-switched data (CSD) channel, which uses neither a modem nor a public switched telephone network (PSTN), according to the predetermined command, so that data can be transmitted between the mobile terminal and the sever;
   (c) performing a PPP (Point-to-Point Protocol) TCP (Transmission Control Protocol) in the IWF device according to the identifier; and
   (d) opening a network interface channel by an AT (ATtention) processing unit of the IWF device according to the IP address of the identifier.

2. The method of claim 1, wherein the predetermined command is an ATtention Dial (ATD) command based on standard protocols of TIA/EIA IS-592.

3. The method of claim 1, wherein the step (a) comprises a step of performing dialing based on WAP (Wireless Application Protocol).

4. The method of claim 1, wherein the step (a) comprises a step of dialing the IP address of an Internet application based on WAP (Wireless Application Protocol).

5. The method of claim 1, wherein the step (b) of synchronizing the RLP is formed based on a code division multiple access (CDMA) system.

6. The method of claim 1, wherein the step (c) of performing the PPP/TCP comprises the sub-steps of:
   (c1) identifying whether the input identifier is a telephone number or the IP address in the AT processing unit of the IWF device; and
   (c2) performing the PPP/TCP in the IWF device according to the identifier if the CSD channel is used for a connection and the identifier is the IP address.

7. The method of claim 6, wherein in the step (d), a modem data channel is opened in the AT processing unit of the IWF device if the identifier is the telephone number, and the network interface channel is opened if the identifier is the IP address.

8. A wireless data transport method performed using a mobile terminal, an interworking function (IWF) device and a server, the method comprising the steps of:
   (a) performing a dialing in the mobile terminal using a predetermined command with an identifier including an IP (Internet Protocol) address;
   (b) synchronizing a RLP (Radio Link Protocol) between the mobile terminal and the IWF device to establish a circuit-switched data (CSD) channel according to the predetermined command, so that data can be transmitted between the mobile terminal and the server;
   (c) performing a PPP (Point-to-Point Protocol)/TCP (Transmission Control Protocol) in the IWF device according to the identifier; and
   (d) opening a network interface channel by an AT (ATtention) processing unit of the IWF device according to the IP address of the identifier,
   wherein the method further comprises, before the step (b), a step (b-1) receiving information about an application to be used in the mobile terminal and about whether a channel to be selected for connection is the CSD channel or a packet-switched data (PSD) channel.

9. The method of claim 8, wherein in the step (a), the dialing is performed using an ATtention Dial (ATD) command with the IP address if the application for the mobile terminal is determined to be an Internet-related application and the selected channel is the CSD channel.

10. A mobile terminal for wireless data transport with a server through an interworking function (IWF) device, comprising:
    an AT (ATtention dial command) processing unit for performing a dialing using a predetermined command with an identifier including an IP (Internet Protocol) address;
    a data formatting unit for formatting data output from the AT processing unit into a circuit-switched data (CSD) format; and
    an RLP (Radio Link Protocol) performing unit for performing RLP synchronization for a radio link between the mobile terminal and the IWF device to establish a CSD channel, which uses neither a modem nor a public switched telephone network (PSTN), so that data can be transmitted between the mobile terminal and the server.

11. The mobile terminal of claim 10, further comprising a WAP (Wireless Application Protocol) performing unit for inputting the identifier including the IP address.

12. The mobile terminal of claim 10, wherein the predetermined command is an ATtention Dial (ATD) command based on standard protocols of TIA/EIA IS-592.

13. A mobile terminal for wireless data transport with a server through an interworking function (IWF) device, comprising:
    an AT (ATtention dial command) processing unit for performing a dialing using a predetermined command with an identifier including an IP (Internet Protocol) address;
    a data formatting unit for formatting the data output from the AT processing unit into a packet-switched data (PSD) format; and
    an RLP (Radio Link Protocol) performing unit for performing RLP synchronization for a radio link between the mobile terminal and the IWF device to establish a CSD channel, so that data can be directly transmitted between the mobile terminal and the server.

14. A mobile terminal for wireless data transport with a server through an interworking function (IWF) device, comprising:
    an AT (ATtention dial command) processing unit for performing a dialing using an ATtention Dial (ATD) command with an identifier including an IP (Internet Protocol) address;
    a data formatting unit for formatting data input from the AT processing unit into circuit-switched data (CSD) or packet-switched data (PSD) according to a selection of a user; and a radio link protocol performing unit for performing an RLP synchronization for a radio link between the mobile terminal and the IWF device to establish a channel selected according to the ATD command, so that data can be transmitted between the mobile terminal and the server.

15. An interworking function (IWF) device for a wireless data transport with a network server, being connected to a mobile terminal, comprising:

an RLP (Radio Link Protocol) performing unit for performing synchronization with the mobile terminal for a radio link, to establish a wireless data channel, which uses neither a modern nor a public switched telephone network (PSTN), so that data can be transmitted between the mobile terminal and the server;

a data formatting unit for extracting dialing information from data of a circuit-switched data (CSD) format input through the RLP performing unit;

an ATtention Dial (ATD) processing unit for extracting an identifier including an IP (Internet Protocol) address from the dialing information; and a network interface unit for connecting to a network server corresponding to the identifier.

16. The interworking function device of claim 15, wherein the dialing information is an ATtention Dial (ATD) command according to standard protocols of TIA/EIA IS-592.

17. An interworking function (IWF) device for wireless data transport with a server, being connected to a mobile terminal, comprising:

an RLP (Radio Link Protocol) performing unit for performing synchronization with the mobile terminal for a radio link, to establish a wireless data channel, so that data can be transmitted between the mobile terminal and the server;

a data formatting unit for selectively extracting an identifier by identifying whether data input through the wireless data channel connected by the RLP performing unit has a circuit-switched data (CSD) format or a packet-switched data (PSD) format;

an ATtention Dial (ATD) processing unit for performing dialing using a predetermined command, with the extracted identifier if the extracted identifier is a telephone number;

a modem unit for connecting to a server corresponding to the telephone number via a public switched telephone network (PSTN) if the extracted identifier is the telephone number; and a network interface unit to connect to a server corresponding to an IP (Internet Protocol) address if the extracted identifier is the IP address.

18. A mobile terminal for wireless data transport with a server through an interworking function (IWF) device, comprising:

an AT (ATtention dial command) processing unit for performing a dialing using an ATtention Dial (ATD) command with an identifier including an IP (Internet Protocol) address;

a data formatting unit for formatting data input from the AT processing unit into circuit-switched data (CSD) or packet-switched data (PSD); and a radio link protocol performing unit for performing an RLP synchronization for a radio link between the mobile terminal and the IWF device to establish a channel selected according to the ATD command, so that data can be transmitted between the mobile terminal and the server.

* * * * *